(12) United States Patent
Kobayashi

(10) Patent No.: US 11,743,607 B2
(45) Date of Patent: Aug. 29, 2023

(54) ELECTRIC APPARATUS, CONTROL METHOD AND NON-TRANSITORY COMPUTER-READABLE STORAGE MEDIUM

(71) Applicant: CANON KABUSHIKI KAISHA, Tokyo (JP)

(72) Inventor: Takashi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/906,989

(22) Filed: Jun. 19, 2020

(65) Prior Publication Data
US 2020/0404198 A1     Dec. 24, 2020

(30) Foreign Application Priority Data

Jun. 21, 2019    (JP) .................................. 2019-115746

(51) Int. Cl.
*H04N 5/232* (2006.01)
*H04N 25/531* (2023.01)
(Continued)

(52) U.S. Cl.
CPC ....... *H04N 25/531* (2023.01); *G02F 1/13306* (2013.01); *H04N 23/667* (2023.01);
(Continued)

(58) Field of Classification Search
None
See application file for complete search history.

(56) References Cited

U.S. PATENT DOCUMENTS

2004/0223075 A1* 11/2004 Furlan .................. H04N 5/2354
                                                      348/363
2010/0123821 A1*  5/2010 Gwak ................ H04N 5/23293
                                                      348/371
(Continued)

FOREIGN PATENT DOCUMENTS

CN    109309793 A    2/2019
CN    109587378 A    4/2019
(Continued)

OTHER PUBLICATIONS

Title: Lookup Table Date: Sep. 1, 2011 URL: https://web.archive.org/web/20110901052223/https://en.wikipedia.org/wiki/Lookup_table (Year: 2011).*

(Continued)

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

The present invention provides an electric apparatus including an image sensor that starts to accumulate electric charges at different timings in different regions, and an optical filter that can be changed between a first concentration and a second concentration higher than the first concentration. The apparatus includes a first mode of executing a global shutter function so as to start exposure for each pixel included in a predetermined region of the image sensor at substantially the same timing, and a second mode of starting exposure for the respective pixels of the image sensor at different timings. A change in a pixel count of image data read out from the image sensor in accordance with information concerning an exposure time set by a user is larger in the first mode than in the second mode.

19 Claims, 6 Drawing Sheets

(51) Int. Cl.
  *G02F 1/133* (2006.01)
  *H04N 25/75* (2023.01)
  *H04N 25/533* (2023.01)
  *H04N 23/73* (2023.01)
  *H04N 25/42* (2023.01)
  *H04N 25/44* (2023.01)
  *H04N 23/667* (2023.01)

(52) U.S. Cl.
  CPC ............ *H04N 23/73* (2023.01); *H04N 25/42* (2023.01); *H04N 25/44* (2023.01); *H04N 25/533* (2023.01); *H04N 25/75* (2023.01)

(56) References Cited

U.S. PATENT DOCUMENTS

| | | | | |
|---|---|---|---|---|
| 2012/0213485 A1* | 8/2012 | Matsuyama | ....... | H04N 5/23245 386/224 |
| 2013/0229553 A1* | 9/2013 | Suzuki | ................... | H04N 5/335 348/296 |
| 2014/0300805 A1* | 10/2014 | Davis | ..................... | H04N 5/238 348/362 |
| 2014/0320734 A1* | 10/2014 | Funatsu | ............... | H04N 5/3456 348/349 |
| 2015/0085077 A1* | 3/2015 | Kim | ..................... | H04N 5/2353 348/46 |
| 2016/0112644 A1* | 4/2016 | Nishi | ................... | H04N 5/3535 348/222.1 |
| 2017/0142383 A1 | 5/2017 | Oka | | |
| 2017/0364736 A1 | 12/2017 | Ollila | | |
| 2019/0037157 A1 | 1/2019 | Matsumura | | |
| 2019/0349557 A1* | 11/2019 | Takasumi | ................. | H04N 9/73 |
| 2020/0280689 A1* | 9/2020 | Takahashi | .............. | H04N 25/53 |
| 2021/0029301 A1* | 1/2021 | Abe | ..................... | H04N 23/667 |

FOREIGN PATENT DOCUMENTS

| | | |
|---|---|---|
| EP | 3462729 A1 | 4/2019 |
| JP | 2007-189528 A | 7/2007 |
| JP | 2008-011298 A | 1/2008 |
| JP | 2008-187615 A | 8/2008 |
| JP | 2016-025511 A | 2/2016 |
| JP | 2016-520859 A | 7/2016 |
| JP | 2017-208612 A | 11/2017 |
| WO | 2014/165698 A1 | 10/2014 |

OTHER PUBLICATIONS

The above documents were cited in a European Search Report dated Oct. 21, 2020, that issued in the corresponding European Patent Application No. 20180640.3.

The above foreign patent documents were cited in a Mar. 21, 2022 Chinese Office Action, with an English Translation, that issued in Chinese Patent Application No. 202010566077.0.

The above foreign patent documents were cited in the Feb. 27, 2023 Japanese Office Action, without an English Translation, that issued in Japanese Patent Application No. 2019-115746.

\* cited by examiner

FIG. 3

| READOUT SCHEME | PERIOD CORRESPONDING TO SINGLE VERTICAL SYNC SIGNAL | HORIZONTAL PIXEL COUNT | VERTICAL PIXEL COUNT | IMAGE SIGNAL | READOUT TIME | TIME REQUIRED TO COLOR AND DECOLOR LIQUID CRYSTAL PANEL | POSSIBLE EXPOSURE TIME [sec] | POSSIBLE EXPOSURE TIME [Angle] |
|---|---|---|---|---|---|---|---|---|
| READOUT SCHEME RM1 | 41.7[msec] | 4500[pix] | 2532[pix] | 14[bit] | 12.5[msec] | 9.5[msec] | 0-19.7[msec] | 0-170[Angle] |
| READOUT SCHEME RM2 | 41.7[msec] | 4500[pix] | 2532[pix] | 12[bit] | 10.7[msec] | 9.5[msec] | 0-21.5[msec] | 0-185[Angle] |
| READOUT SCHEME RM3 | 41.7[msec] | 3840[pix] | 2160[pix] | 14[bit] | 10.7[msec] | 9.5[msec] | 0-21.5[msec] | 0-185[Angle] |

F I G. 6

| READOUT SCHEME | HORIZONTAL PIXEL COUNT | VERTICAL PIXEL COUNT | IMAGE SIGNAL | READOUT TIME | TIME REQUIRED TO COLOR AND DECOLOR LIQUID CRYSTAL PANEL | FRAME RATE BEING POSSIBLE TO SET |
|---|---|---|---|---|---|---|
| READOUT SCHEME RM1 | 4500[pix] | 2532[pix] | 14[bit] | 12.5[msec] | 9.5[msec] | 45[fps] |
| READOUT SCHEME RM3 | 3840[pix] | 2160[pix] | 14[bit] | 10.7[msec] | 9.5[msec] | 50[fps] |
| READOUT SCHEME RM4 | 2600[pix] | 1463[pix] | 14[bit] | 7.2[msec] | 9.5[msec] | 60[fps] |
| READOUT SCHEME RM5 | 2600[pix] | 1463[pix] | 12[bit] | 6.2[msec] | 9.5[msec] | 63[fps] |
| READOUT SCHEME RM6 | 1920[pix] | 1080[pix] | 12[bit] | 4.6[msec] | 9.5[msec] | 71[fps] |
| READOUT SCHEME RM7 | 1920[pix] | 1080[pix] | 10[bit] | 3.8[msec] | 9.5[msec] | 75[fps] |

FIG. 7

| READOUT SCHEME | HORIZONTAL PIXEL COUNT | VERTICAL PIXEL COUNT | IMAGE SIGNAL | READOUT TIME | TIME REQUIRED TO COLOR AND DECOLOR LIQUID CRYSTAL PANEL | FRAME RATE BEING POSSIBLE TO SET |
|---|---|---|---|---|---|---|
| READOUT SCHEME RM4 | 2600[pix] | 1463[pix] | 14[bit] | 7.2[msec] | 9.5[msec] | 60[fps] |
| READOUT SCHEME RM5' | 1920[pix] | 1080[pix] | 14[bit] | 5.3[msec] | 9.5[msec] | 67[fps] |
| READOUT SCHEME RM6 | 1920[pix] | 1080[pix] | 12[bit] | 4.6[msec] | 9.5[msec] | 71[fps] |
| READOUT SCHEME RM7 | 1920[pix] | 1080[pix] | 10[bit] | 3.8[msec] | 9.5[msec] | 75[fps] |

ELECTRIC APPARATUS, CONTROL METHOD AND NON-TRANSITORY COMPUTER-READABLE STORAGE MEDIUM

BACKGROUND OF THE INVENTION

Field of the Invention

The present invention relates to an electric apparatus, a control method and a non-transitory computer-readable storage medium.

Description of the Related Art

Motion-picture film cameras generally use a rotary shutter system of controlling exposure by adjusting the angle of an aperture window with respect to a film in synchronism with the frame advance of the film. In recent years, with the digitalization of film cameras, there is no need to perform frame advance of a film, and an electronic shutter system is generally used, which adjusts exposure time by controlling the accumulation and resetting of an electric charge in each pixel on an image sensor.

The electronic shutter system need not move the aperture window in synchronism with frame advance and can control a control register on the image sensor by using electrical signals. On the other hand, a rolling shutter type solid-state image sensor such as a CMOS image sensor operates at different exposure start timings and different exposure end timings for the respective horizontal lines, and hence sometimes suffers from a deterioration in the quality of a captured image. For example, the contour of an object moving fast looks distorted or the flash band phenomenon is caused by a difference in change in short-time amount of light for each vertical line, such as flash light emission (difference in exposure state). This sometimes leads to a deterioration in image quality. In addition, when image capturing is performed under a light source that periodically changes in light amount, such as a fluorescent light, for example, a fluorescent light flicker phenomenon in which noise like a stripe pattern occurs in the vertical direction leads to a deterioration in image quality caused by the rolling shutter.

Japanese Patent Laid-Open No. 2008-11298 and Japanese Patent Laid-Open No. 2016-520859 have proposed image capturing systems that match the exposure start timings and the exposure end timings on the respective lines by combining an image sensor and a liquid crystal shutter (liquid crystal material) in order to reduce a deterioration in image quality caused by such a rolling shutter type solid-stage image sensor. Such an image capturing system is generally called the global shutter mode.

Japanese Patent Laid-Open No. 2008-11298 discloses a technique of reading out signals (image signals) from the pixels on each horizontal line after light-shielding all the pixels of the image sensor by controlling the liquid crystal shutter while matching exposure start times by collectively resetting all the horizontal lines when generating an image. This technique can match the exposure start timings on the respective horizontal lines by collective resetting on the image sensor. In addition, although the timings of reading out image signals themselves do not coincide with each other, an image signal is read out for each horizontal line upon light shielding of all the pixels of the image sensor by the liquid crystal shutter, and hence the exposure end timings are substantially matched.

Japanese Patent Laid-Open No. 2016-520859 discloses a technique of substantially controlling the exposure start timing and the exposure end timing by the liquid crystal shutter. Such a technique is configured to match the exposure start timings on the respective horizontal lines by starting to accumulate an electric charge for each horizontal line while all the pixels of the image sensor are light-shielded by the liquid crystal shutter and increasing the degree of transparency of the liquid crystal shutter at the time of the start of accumulation on all the horizontal lines. In addition, this technique is configured to substantially match the exposure end timings on the respective horizontal lines by reading out electric charges for each horizontal line while light-shielding all the pixels of the image sensor by the liquid crystal shutter after exposure for a desired time.

According to the techniques disclosed in Japanese Patent Laid-Open No. 2008-11298 and Japanese Patent Laid-Open No. 2016-520859, all the pixels of the image sensor are kept light-shielded by the liquid crystal shutter during a period in which the exposure timings (exposure start timings and exposure end timings) differ. This makes it impossible for the image sensor to perform exposure during this period. Accordingly, the accumulation time of the image sensor needs to be prolonged by a time corresponding to the difference in exposure timing in addition to a desired exposure time. This means that when moving image capturing is performed by repeatedly capturing an image of an object, the time used for exposure is limited in an image capturing cycle corresponding to a frame rate. Accordingly, the frame rate that can be set is limited depending on the magnitude of the difference in exposure timing.

SUMMARY OF THE INVENTION

The present invention provides a technique advantageous in implementing a global shutter mode.

According to one aspect of the present invention, there is provided an electric apparatus including an image sensor that starts to accumulate electric charges at different timings in different regions, and at least one processor or circuit configured to perform operations to provide: a control unit configured to control driving of an optical filter and the image sensor, wherein the optical filter is positioned at a front surface of the image sensor, and is driven such that it can be changed between at least a first concentration and a second concentration, the second concentration being higher than the first concentration, wherein the electric apparatus includes a first mode of executing a global shutter function so as to start exposure for each pixel included in a predetermined region of the image sensor at substantially the same timing, and a second mode of starting exposure for the respective pixels of the image sensor at different timings, by causing the control unit to control driving of the optical filter and the sensor, and wherein a change in a pixel count of image data read out from the image sensor in accordance with information concerning an exposure time set by a user is larger in the first mode than in the second mode.

Further features of the present invention will become apparent from the following description of exemplary embodiments with reference to the attached drawings.

BRIEF DESCRIPTION OF THE DRAWINGS

FIG. 3 is a view showing an example of specific numerical values respectively concerning a plurality of readout schemes.

FIG. 6 is a view showing an example of specific numerical values respectively concerning a plurality of readout schemes.

FIG. 7 is a view showing an example of specific numerical values respectively concerning a plurality of readout schemes.

DESCRIPTION OF THE EMBODIMENTS

Figure 1:
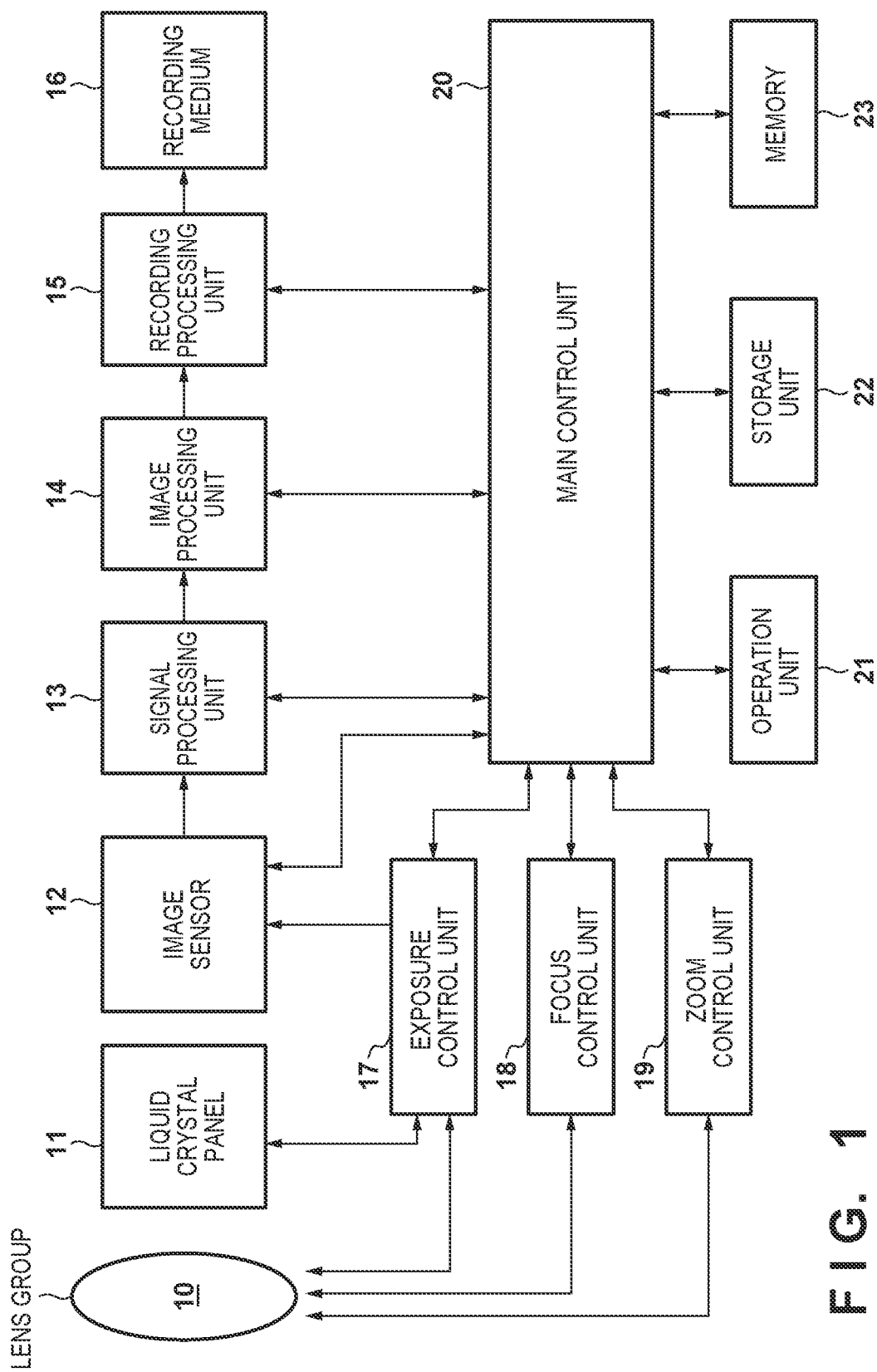
FIG. 1 is a schematic view showing the arrangement of an image capturing apparatus according to one aspect of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Each of the embodiments of the present invention described below can be implemented solely or as a combination of a plurality of the embodiments or features thereof where necessary or where the combination of elements or features from individual embodiments in a single embodiment is beneficial. Furthermore, in the attached drawings, the same reference numerals are given to the same or similar configurations, and redundant description thereof is omitted.

FIG. 1 is a schematic view showing the arrangement of an image capturing apparatus 1 according to one aspect of the present invention. The image capturing apparatus 1 is an electric apparatus that can obtain, for example, a moving image of an object by capturing an image of the object. According to an embodiment, this apparatus is embodied as a digital camera. The image capturing apparatus 1 includes a lens group 10, a liquid crystal panel 11, an image sensor 12, a signal processing unit 13, an image processing unit 14, a recording processing unit 15, and a recording medium 16. The image capturing apparatus 1 further includes an exposure control unit 17, a focus control unit 18, a zoom control unit 19, a main control unit 20, an operation unit 21, a storage unit 22, and a memory 23.

The lens group 10 includes a mechanism for controlling exposure by using a stop and a mechanism for controlling a focus operation and a zoom operation. The lens group 10 forms an optical image by guiding light (incident light) from an object onto the image sensor 12 through the liquid crystal panel 11. In this case, exposure (brightness) on a captured image is controlled by driving the stop included in the lens group 10, changing the transparency (fading rate) of the liquid crystal of the liquid crystal panel 11, and controlling the accumulation time of an electric charge and the amplification factor of an electrical signal in each pixel of the image sensor 12. Note that the lens group 10 may be incorporated in the image capturing apparatus 1 as a so-called lens-integrated image capturing apparatus. Alternatively, an interchangeable lens including the lens group 10 may be configured to be detachably mounted on the image capturing apparatus 1. In this case, in general, the image capturing apparatus 1 and an interchangeable lens each has a coupling portion called a mount, and hence may be configured to be detachably attached to each other through the mounts.

The liquid crystal panel 11 functions as an ND (Neutral Density) filter (optical filter) that has a variable transmittance with respect to light from an object so as to set an incident state in which light enters the image sensor 12 or a light-shielded state in which the image sensor 12 is shielded from light. In this embodiment, the liquid crystal panel 11 is arranged between the lens group 10 and the image sensor 12. However, this is not exhaustive. The liquid crystal panel 11 may be able to reduce the amount of light in accordance with the transmittance. For example, the liquid crystal panel 11 may be arranged outside the lens group 10 (located closer to an object than the lens group 10) or may be configured to be arranged inside the lens group 10 and move in the optical axis direction together with a lens. Although the embodiment will exemplify the liquid crystal panel 11 that can electrically control transmittance, the shutter need not be made of a liquid crystal material and may have other physical properties as long as it is able to electrically change transmittance at high speed. The driving scheme of the liquid crystal panel 11 is not limited to the TN (Twisted Nematic) scheme and may be another driving scheme. The embodiment has also exemplified the arrangement having the liquid crystal panel 11 incorporated in the image capturing apparatus 1. However, this is not exhaustive. For example, a unit incorporating the liquid crystal panel 11 may be detachably mounted in the image capturing apparatus 1. For example, in order to improve usability, the above mount unit may be configured to incorporate the liquid crystal panel 11 while being itself configured to be detachably mounted in the image capturing apparatus 1.

The image sensor 12 includes a plurality of pixels arrayed in a matrix pattern and accumulates an electric charge corresponding to light from an object. The signal processing unit 13 converts the electric charge read out from each pixel of the image sensor 12 into an image signal (electrical signal) and outputs the signal to the image processing unit 14. The image processing unit 14 performs luminance correction processing such as gain correction, color compensation processing such as white balance compensation, and other types of signal processing for the image signal output from the signal processing unit 13. The image processing unit 14 performs non-linear conversion processing for the image signal in accordance with the output device. The recording processing unit 15 encodes the image signal output from the image processing unit 14 to convert the signal into an image signal in a form and size suitable for recording. The recording medium 16 records the image signal in a recordable form, which is output from the recording processing unit 15.

The main control unit 20 includes a processor typified by a CPU and controls each unit of the image capturing apparatus 1 to make the image capturing apparatus 1 operate (control the above series of processing) by executing programs stored in the storage unit 22. The storage unit 22 is an electrically erasable and programmable nonvolatile storage medium and stores (saves) constants, programs, and the like for the operation of the main control unit 20. The memory 23 functions as a work memory in which, for example, programs output from the storage unit 22 are deployed.

The main control unit 20 accepts an operation from the user via the operation unit 21. The main control unit 20 makes settings concerning exposure, focus, and zoom via the exposure control unit 17, the focus control unit 18, and the zoom control unit 19 based on various types of image capturing modes corresponding to the operations accepted via the operation unit 21 and the brightness of an object. Although this embodiment includes the exposure control unit 17, the focus control unit 18, and the zoom control unit 19 separately from the main control unit 20, the embodiment may integrally include the main control unit 20, the exposure control unit 17, the focus control unit 18, and the zoom control unit 19.

In this embodiment, the main control unit 20 provides a global shutter mode as a shutter mode for the image sensor 12. The global shutter mode is a shutter mode of matching the exposure start timing of starting the accumulation of an electric charge in each pixel of the image sensor 12 and the exposure end timing of ending the accumulation of an electric charge in each pixel of the image sensor 12. The main control unit 20 provides the global shutter mode by controlling the transmittance of the liquid crystal panel 11 and the accumulation and reading out of an electric charge in each pixel of the image sensor 12.

The general global shutter mode implemented by a combination of control of the driving (the accumulation and reading out of electric charges) of the image sensor 12 and control of the driving (concentration (transmittance)) of the liquid crystal panel 11 will be described with reference to FIG. 2. The upper part of FIG. 2 indicates the exposure start timing at the pixels on each line in the image sensor 12 and the exposure end timing at the pixels on each line in the image sensor 12. Note that the exposure end timing is also the timing of starting to read out electric charges accumulated in the pixels on each line in the image sensor 12. The following is a case in which the maximum exposure time corresponding to the frame rate set in the image capturing apparatus 1 is implemented.

Consider first the driving of the image sensor 12. The main control unit 20 inputs a vertical sync signal Vd corresponding to the frame rate to the image sensor 12. The image sensor 12 sequentially starts accumulating electric charges from the pixels on the uppermost line in synchronism with the vertical sync signal Vd input from the main control unit 20. The image sensor 12 sequentially ends accumulating electric charges from the pixels on the uppermost line and starts reading out electric charges (image signals) at a timing immediately before the next vertical sync signal Vd is input from the main control unit 20.

Consider next the driving of the liquid crystal panel 11. The lower part of FIG. 2 indicates a change in the concentration (transmittance) of the liquid crystal panel 11 in accordance with the driving of the image sensor 12. The liquid crystal panel 11 light-shields the entire image sensor 12 (that is, sets the image sensor 12 to a light-shielded state in which the image sensor 12 is shielded from incident light by coloring) by maximizing the concentration at a timing before the accumulation of an electric charge in each pixel of the image sensor 12 is sequentially started. The liquid crystal panel 11 then lets light enter the image sensor 12 by minimizing the concentration (that is, sets the image sensor 12 in an incident state in which light enters the image sensor 12 by decolorization) at the timing of starting to accumulate electric charges in the pixels on the lowermost line of the image sensor 12. When the concentration of the liquid crystal panel 11 is minimized, that is, completely decolorized, the respective pixels of the image sensor 12 are simultaneously exposed. At this time, the liquid crystal panel 11 can quickly (instantly) change the concentration in response to a change in voltage by PWM (Pulse Width Modulation). Note, however, that even if the liquid crystal panel 11 can quickly change the concentration, it takes a minute (small) time in practice, and hence each pixel of the image sensor 12 accumulates electric charges upon being exposed to light during this period. Accordingly, the concentration of the liquid crystal panel 11 is set to an intermediate concentration during a period of decolorization, and a half period of a period of decolorization can be regarded as a period in which each pixel of the image sensor 12 is exposed.

When a desired exposure time has elapsed since the respective pixels of the image sensor 12 are simultaneously exposed, the liquid crystal panel 11 shields the entire image sensor 12 from light by maximizing the concentration. In practice, it takes a minute time to perform such coloring, and hence each pixel of the image sensor 12 accumulates an electric charge upon being exposed to light during this period. Accordingly, the concentration of the liquid crystal panel 11 is set to an intermediate concentration during a period of colorization, and a half period of a period of colorization can be regarded as a period in which each pixel of the image sensor 12 is exposed. When the light-shielding of the entire image sensor 12 is completed by the liquid crystal panel 11, the reading-out of electric charges is sequentially started from the pixels on the uppermost line of the image sensor 12.

As described above, the main control unit 20 synchronously controls the driving of the image sensor 12 and the driving of the liquid crystal panel 11. This makes it possible to implement the global shutter mode in the rolling shutter type image sensor 12 by matching the exposure start timing at the pixels on each line and the exposure end timing at the pixels on each line.

Figure 2:
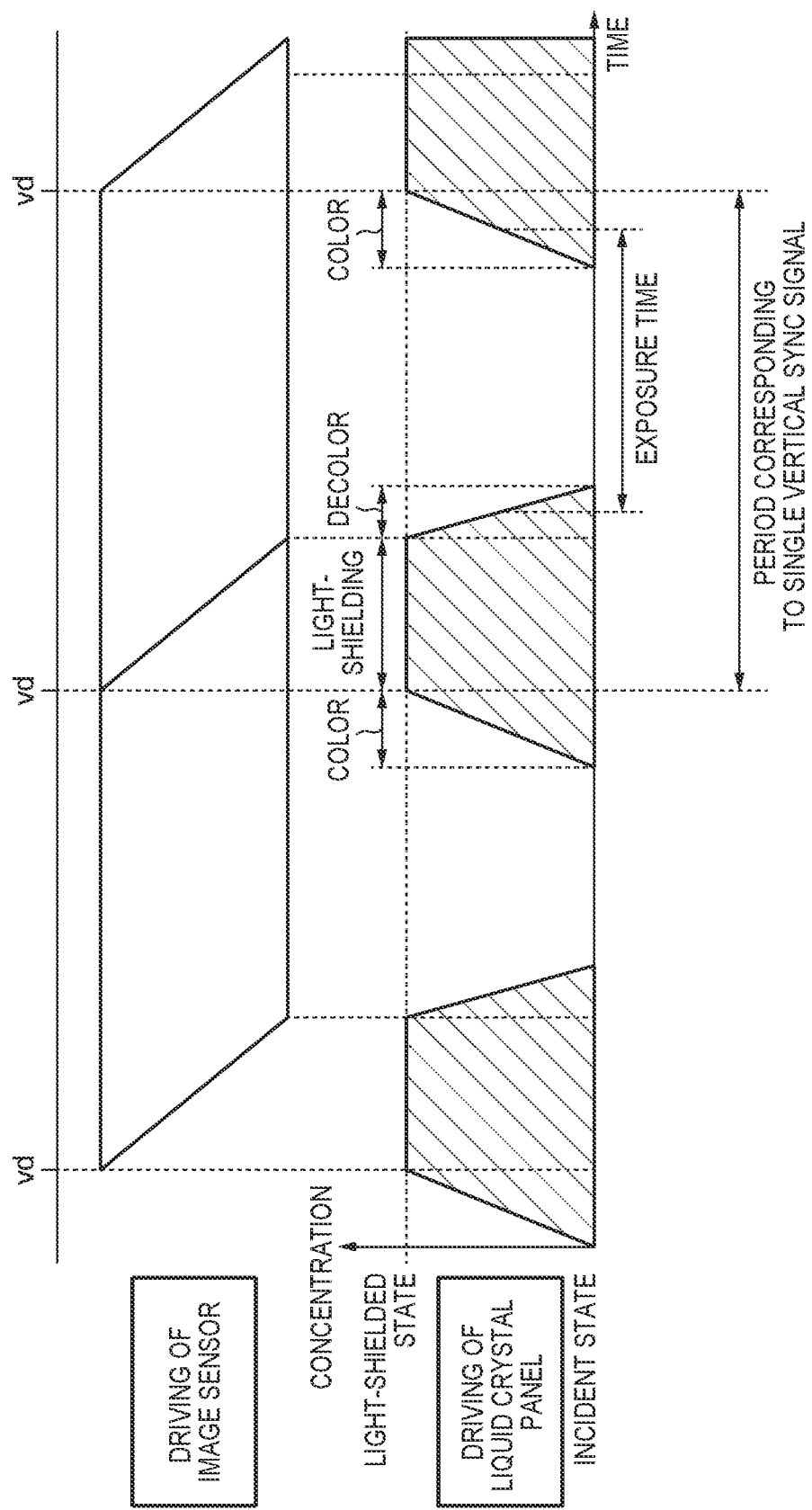
FIG. 2 is a view for explaining a general global shutter mode.

Referring to FIG. 2, considering the exposure time in a period corresponding to the single vertical sync signal Vd, the image sensor 12 cannot be exposed, as described above, during a period in which the image sensor 12 is set in the light-shielded state and a period corresponding to the time required to color and decolor the liquid crystal panel 11. Accordingly, in the global shutter mode, the time during which the image sensor 12 can be exposed is greatly limited. In addition, limiting the time during which the image sensor 12 can be exposed will limit the period (image capturing period) in which an image of an object is captured, that is, the frame rate. As described above, in the global shutter mode, the frame rate that can be set in the image capturing apparatus 1 is limited.

In this embodiment, different readout schemes are used to read out an electric charge from each pixel of the image sensor 12 depending on whether the global shutter mode or a shutter mode other than the global shutter mode is provided as a shutter mode for the image sensor 12. For example, when the global shutter mode is provided, the main control unit 20 decides a readout scheme when reading out an electric charge from each pixel of the image sensor 12 based on the frame rate or exposure time set in the image capturing apparatus 1. A plurality of readout schemes with different frame rates and different exposure times are stored in the storage unit 22 in advance. The main control unit 20 decides a readout scheme when reading out an electric charge from each pixel of the image sensor 12 from a plurality of readout schemes stored in the storage unit 22 by selecting one readout scheme satisfying the frame rate or exposure time set in the image capturing apparatus 1. This can solve the problem in the global shutter mode described above.

In the global shutter mode, as described above, the exposure time that can be controlled is limited in complying with periods of colorization and decolorization of the liquid crystal panel 11 and periods of differences in exposure start timing and exposure end timing at the pixels on each line of the image sensor 12. In particular, the periods of differences in exposure start timing and exposure end timing at the pixels on each line of the image sensor 12 are long, resulting in increasing influence on the exposure time. Therefore, shortening the periods of differences in exposure start timing and exposure end timing at the pixels on each line of the image sensor 12 leads to reductions in exposure time and limitations on frame rates.

FIG. 3 shows an example of specific numerical values indicating the relationship between the numbers of pixels from which electric charges are read out, the differences in exposure start timing required, and the differences in exposure end timing required in the rolling shutter type image sensor 12. In this case, assuming that the standard frame rate used in motion-picture photography is 24 fps, a period corresponding to the single vertical sync signal Vd which is set to periodically capture 24 images per sec is 41.7 msec (1/24 sec).

Consider readout scheme RM1 in which the size of a captured image is defined by 4,500 [pix] in the horizontal direction (horizontal pixel count) and 2,532 [pix] in the vertical direction (vertical pixel count), and the differences in exposure start timing and exposure end timing are 12.5 [msec]. In this case, as shown in FIG. 3, the possible exposure time is 0 [msec] to 19.7 [msec].

The differences in exposure start timing and exposure end timing change depending on the readout scheme used to read out electric charges from the image sensor 12. For example, readout scheme RM2 is a readout scheme in which because the bit count of an image signal is reduced from 14 bits to 12 bits (the bit depth is changed), the differences in exposure start timing and exposure end timing are smaller than those in readout scheme RM1. Setting such a readout scheme can implement a readout scheme with small differences in exposure start timing and exposure end timing as compared with a readout scheme when a shutter mode other than the global shutter mode is provided.

In general, in order to perform image processing such as electronic vibration control and geometric deformation, electric charges are sometimes read out from pixels including surplus pixels and exceeding the size of an image to be recorded on the recording medium 16 and used by the image processing unit 14 to improve image quality. In such a case, it is possible to reduce the number of surplus pixels and read out an image having a size to be recorded on the recording medium 16, that is, a QFHD image (horizontal pixel count: 3,840 [pix], vertical pixel count: 2,160 [pix]). As shown in FIG. 3, this makes it possible to implement readout scheme RM3 in which the differences in exposure start timing and exposure end timing are small as in readout scheme RM2.

In a traditional film camera, an exposure time has been expressed with reference to the aperture angle of an aperture window at the time of frame advance. In this case, an exposure time set with reference to 180° which corresponds to a time half of the frame rate has been mainly used as a standard exposure time. As shown in FIG. 3, in readout scheme RM1, 180 [angle], which is an exposure time used as a reference, cannot be set (selected). In contrast to this, in this embodiment, changing the readout scheme in the global shutter mode into a readout scheme with a small rolling shutter as in readout scheme RM2 or the readout scheme 3 can expand the range of exposure times that can be set in the image capturing apparatus 1. This makes it possible to set an exposure time of 180 [angle] as a standard exposure time and improve usability for the user.

According to the above description, when the global shutter mode is selected (provided), limitations on the exposure time and frame rate can be reduced by changing to the readout scheme with a small rolling shutter. When, however, the number of surplus pixels required for image processing is reduced or the bit depth of an image signal is reduced to reduce limitations on the exposure time and frame rate, the quality of a captured image may deteriorate. Even when the user has selected the global shutter mode, there is sometimes no need to change to the readout scheme with a small rolling shutter depending on the frame rate or shutter speed desired to be set by the user. Accordingly, a readout scheme may be decided (selected) in consideration of the balance between a deterioration in the quality of a captured image and the frame rate or shutter speed.

Figure 4:
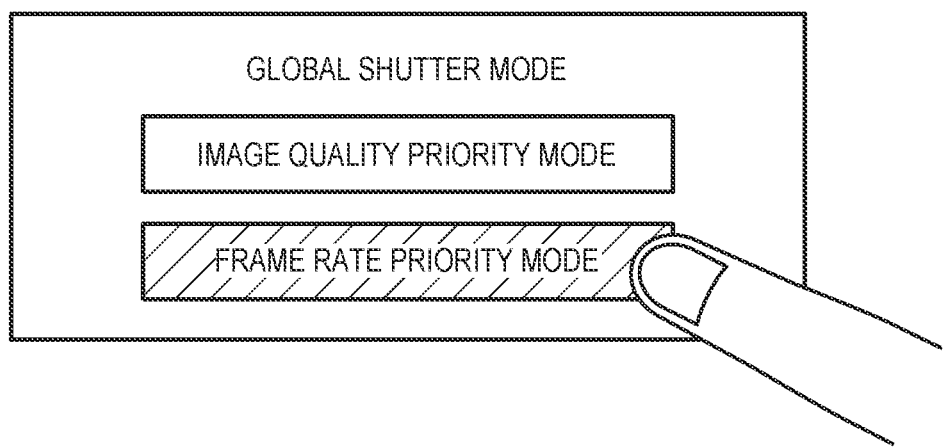
FIG. 4 is a view showing an example of a user interface (UI).

FIG. 4 shows an example of a user interface (UI) selected by the user when the global shutter mode is provided. Such UI is provided for the user via the operation unit 21 including a display device such as a touch panel under the control of the main control unit 20. The UI makes the user select an image quality priority mode (first mode) giving priority to the quality of an image obtained by reading out an electric charge from each pixel of the image sensor 12 or a frame rate priority mode (second mode) giving priority to the frame rate in the global shutter mode.

The image quality priority mode allows the user to set a frame rate or shutter speed that can be implemented within a range corresponding to a preset image size. Assume that readout scheme RM1 shown in FIG. 3 is set. In this case, when the horizontal image size is set to 4.5 K, the exposure time that can be set is 0 to 19.7 msec, and the frame rate can be set up to about 45 fps. In practice, however, there is a use case in which the user wants to set 50 fps or 59.94 fps as a frame rate. In addition, although 45 fps can be set as the maximum frame rate that can be set, there is a use case in which the shutter speed that can be set becomes infinitely high to result in low usability. In order to cope with this case, this embodiment allows the user to select the frame rate priority mode as a mode giving priority to the frame rate that can be set. In the frame rate priority mode, the readout scheme of reading out electric charges from the image sensor 12 is changed in accordance with the frame rate set in the image capturing apparatus 1 without placing any limitations on frame rate. For example, in the frame rate priority mode, among the readout schemes satisfying the frame rate set in the image capturing apparatus 1, the readout scheme that maximizes the quality of a captured image is set (selected).

Figure 5:
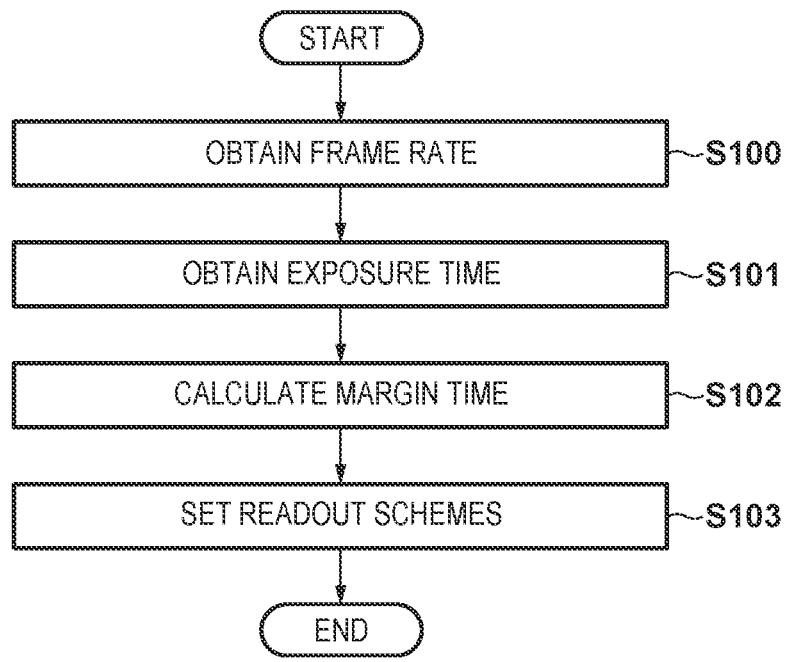
FIG. 5 is a flowchart for explaining the processing of setting a readout scheme.

The processing of setting a readout scheme in the frame rate priority mode will be described with reference to FIG. 5. In step S100, the main control unit 20 obtains the frame rate set in the image capturing apparatus 1. In step S101, the main control unit 20 obtains the exposure time (shutter speed) set in the image capturing apparatus 1. In step S102, the main control unit 20 calculates a margin time in a period corresponding to the single vertical sync signal Vd by using the frame rate obtained in step S100 and the exposure time obtained in step S101. More specifically, the main control unit 20 calculates a period corresponding to the single vertical sync signal Vd as the reciprocal of the frame rate, and subtracts the exposure time obtained in step S101 and the time required to color and decolor the liquid crystal panel 11 from the calculated period. The time calculated in this manner is the margin time remaining in the period corresponding to the single vertical sync signal Vd, and corresponds to the time that can be spent to read out electric charges from the image sensor 12. In step S103, the main control unit 20 sets a readout scheme that maximizes the quality of a captured image from the plurality of readout schemes stored in the image capturing apparatus 1 (for example, the storage unit 22) in advance based on the margin time calculated in step S102.

The processing of setting one readout scheme from a plurality of readout schemes will be described below with reference to specific numerical values. FIG. 6 shows an example of the relationship between readout schemes and the frame rates that can be set. Readout schemes RM1 and RM3 to RM7 differ in image size and the bit depth of an image signal. When an image to be recorded on the recording medium 16 is a QFHD image, a readout scheme that can implement maximum image quality is set from readout schemes RM1 and RM3 to RM5. When, for example, the frame rate is set to 29.97 fps and the shutter speed is set to $1/100$ sec, readout scheme RM3 is set. In readout scheme RM3, when the frame rate is 29.97 fps, the shutter speed can be set up to $1/75$ sec. The quality of a captured image is highest in this readout scheme.

When readout scheme RM4 or the readout scheme RM5 is set as well, the number of pixels undergoing readout is less than that of a QFHD image. However, generating a QFHD image by up-conversion in image processing can maintain the size of an image to be recorded on the recording medium 16.

Consider a case in which the size of an image to be recorded on the recording medium 16 is set to that of an FHD image (horizontal pixel count: 1,920 [pix], vertical pixel count: 1,080 [pix]), the frame rate is set to 50 fps, and the shutter speed is set to $1/250$ sec. FIG. 7 shows an example of readout schemes suitable for this case. Readout schemes RM4, RM5', RM6, and RM7 differ in image size and the bit depth of an image signal. In readout scheme RM4, pixels corresponding to an image size (surplus pixels) equal to or more than that of an FHD image undergo readout from the image sensor 12. The image quality may be improved by the oversampling processing of generating an FHD image using the surplus pixels. Assume that a period corresponding to the single vertical sync signal Vd at a frame rate of 50 fps is 20 msec, the shutter speed is $1/250$ sec (4 msec), and the time required to color and decolor the liquid crystal panel 11 is 9.5 msec. In this case, the readout time needs to be 6.5 msec or less. In this case, readout scheme RM5' is set.

As described above, in the frame rate priority mode, setting a readout scheme that can obtain an optimal image quality in accordance with the frame rate and shutter speed set in the image capturing apparatus 1 makes it possible to set an arbitrary frame rate while implementing the global shutter mode.

This embodiment has exemplified the image capturing apparatus 1 that can perform recording at an arbitrary frame rate by combining a physical shutter that can electrically control transmittance, such as a liquid crystal material, and a rolling shutter type solid-state image sensor. Although the embodiment has exemplified the specific specifications of the readout schemes of reading out electric charges from the image sensor 12, the embodiment can be applied to an image sensor with different specifications such as a readout time, pixel count, and bit depth. In addition, the embodiment has exemplified, as a readout scheme with a different readout time, the control specifications including a pixel count and a bit depth as conditions. However, readout schemes may differ in other conditions. For example, the embodiment may use, for example, a method of shortening the readout time by using a readout operation using a multilayer image sensor, a method of switching readout schemes a plurality of times from one pixel while changing sensitivity, or a method of switching readout schemes for an image for generating parallax for focus detection. Although the embodiment has omitted a description of output destinations of images, the output destinations may include a playback device, an image capturing apparatuses, and other types of devices. This does not limit the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2019-115746 filed on Jun. 21, 2019, which is hereby incorporated by reference herein in its entirety.

What is claimed is:

1. An electric apparatus comprising:
an image sensor that starts to accumulate electric charges at different timings in different regions; and
at least one processor or circuit configured to perform operations to provide:
a control unit configured to control driving of an optical filter and the image sensor, wherein the optical filter is positioned at a front surface of the image sensor, and is driven such that it can be changed between at least a first concentration and a second concentration, the second concentration being higher than the first concentration,
wherein the electric apparatus includes a selectable first mode of starting exposure for each pixel included in a predetermined region of the image sensor at substantially a first same timing, and a selectable second mode of starting exposure for the respective pixels of the image sensor at different timings with respect to the first mode, by causing the control unit to control driving of the optical filter and the sensor, wherein the control unit is further configured to control selection of a particular readout scheme from a plurality of stored readout schemes for reading out an electric charge from each pixel of the image sensor, wherein selection of the particular readout scheme prioritizes (1) image quality when an image quality priority mode is selected, and (2) frame rate when a frame rate priority mode is selected, wherein a change in a pixel count of image data read out from the image sensor in accordance with information concerning an exposure time set by a user is smaller in the image quality priority mode than in the frame rate priority mode, and wherein the control unit performs control such that a pixel count of image data read out from the image sensor, in the image quality priority mode when a predetermined exposure time is set, is greater than a pixel count of image data read out from the image sensor in the frame rate priority mode when the predetermined exposure time is set.

2. The electric apparatus according to claim 1, wherein the optical filter changes in concentration in accordance with an applied voltage.

3. The electric apparatus according to claim 1, wherein a transmittance with respect to light from an object of the optical filter changes in accordance with the concentration of the optical filter.

4. The electric apparatus according to claim 3, wherein the image sensor starts to sequentially accumulate electric charges from one region of an image capturing region to another region in synchronism with a predetermined sync signal, and the control unit implements starting exposure for each pixel included in the predetermined region of the image sensor at substantially the first same timing in the first mode by synchronously controlling driving of the image sensor and the optical filter.

5. The electric apparatus according to claim 4, wherein the control unit performs control to end exposure for each pixel of the image sensor at substantially a second same timing in the first mode by increasing a concentration of the optical filter while electric charges are accumulated in pixels included in the predetermined region of the image sensor.

6. The electric apparatus according to claim 3, all pixels of the image sensor are kept light-shielded by the optical filter during a period from start timings of reading out the pixels on the uppermost line to end timings of reading out the pixels on the lowermost line.

7. The electric apparatus according to claim 3, the optical filter maximizes the concentration during a period from start timings of reading out the pixels on the uppermost line to end timings of reading out the pixels on the lowermost line.

8. The electric apparatus according to claim 1, wherein information concerning the exposure time is at least one of an exposure time and a frame rate when a moving image is obtained.

9. The electric apparatus according to claim 8, wherein the control unit performs control to reduce a pixel count of image data read out from the image sensor in the frame rate priority mode when a user sets a second exposure time longer than a first exposure time, as compared with a case in which the user sets the first exposure time.

10. The electric apparatus according to claim 8, wherein the control unit performs control to reduce a pixel count of image data read out from the image sensor in the frame rate priority mode when a user sets a second frame rate higher than a first frame rate as compared with a case in which the user sets the first frame rate.

11. The electric apparatus according to claim 1, wherein the control unit performs control to enable to change a pixel count of image data read out from the image sensor in accordance with information concerning the exposure time set by a user in the frame rate priority mode, and not to change the pixel count of the image data read out from the image sensor regardless of information concerning the exposure time set by the user in the image quality priority mode when the user has designated in advance a size of image data read out from the image sensor to a predetermined size.

12. The electric apparatus according to claim 1, wherein in the first mode, a concentration of the optical filter is increased during accumulation of electric charges by the image sensor.

13. The electric apparatus according to claim 1, wherein in the first mode, a concentration of the optical filter is increased before starting to accumulate electric charges in the image sensor.

14. The electric apparatus according to claim 1, wherein the control unit performs control such that a pixel count of image data read out from the image sensor in a vertical direction, in the image quality priority mode when the predetermined exposure time is set, is greater than a pixel count of image data read out from the image sensor in a vertical direction in the frame rate priority mode when the predetermined exposure time is set.

15. The electric apparatus according to claim 1, wherein the control unit performs control to reduce a bit count of image data read out from the image sensor in the first mode.

16. The electric apparatus according to claim 1, wherein the electric apparatus is an image capturing apparatus to and from which a unit including the optical filter can be attached and detached.

17. The electric apparatus according to claim 1, wherein the electric apparatus is an image capturing apparatus including the optical filter.

18. A method of controlling an electric apparatus including an image sensor that starts to accumulate electric charges at different timings in different regions, the method comprising:

controlling driving of an optical filter and the image sensor, wherein the optical filter is positioned at a front surface of the image sensor and is driven such that it can be changed between at least a first concentration and a second concentration, the second concentration being higher than the first concentration, wherein the electric apparatus includes a selectable first mode of starting exposure for each pixel included in a predetermined region of the image sensor at substantially a first same timing, and a selectable second mode of starting exposure for the respective pixels of the image sensor at different timings with respect to the first mode, by controlling driving of the optical filter and the image sensor, further controlling selection of a particular readout scheme from a plurality of stored readout schemes for reading out an electric charge from each pixel of the image sensor, wherein selection of the particular readout scheme prioritizes (1) image quality when an image quality priority mode is selected, and (2) frame rate when a frame rate priority mode is selected, wherein a change in a pixel count of image data read out from the image sensor in accordance with information concerning an exposure time set by a user is smaller in the image quality priority mode than in the frame rate priority mode, and wherein a pixel count of image data read out from the image sensor, in the image quality priority mode when a predetermined exposure time is set, is controlled so as to be greater than a pixel count of image data read out from the image sensor in the frame rate priority mode when the predetermined exposure time is set.

19. A non-transitory computer-readable storage medium storing a program that when executed on a computer causes the computer to perform the method according to claim 18.

* * * * *